United States Patent [19]

Minagawa

[11] Patent Number: 4,688,420

[45] Date of Patent: Aug. 25, 1987

[54] THROTTLE VALVE POSITION-DETECTING DEVICE FOR A VEHICLE ENGINE

[75] Inventor: Kazuji Minagawa, Tokoname, Japan

[73] Assignee: Nippondenso Co., Ltd., Kariya, Japan

[21] Appl. No.: 870,865

[22] Filed: Jun. 5, 1986

[30] Foreign Application Priority Data

Jun. 5, 1985 [JP] Japan ............................ 60-121858

[51] Int. Cl.⁴ ............................ G01M 15/00

[52] U.S. Cl. ............................ 73/118.1

[58] Field of Search ............................ 73/118.1, 866.1; 123/494; 74/10.9; 403/146; 464/112; 200/61.44

[56] References Cited

U.S. PATENT DOCUMENTS 4,581,924 4/1986 Otobe et al. ............ 73/118.1

4,616,504 10/1986 Overcash et al. ............ 73/118.1

*Primary Examiner*—Jerry W. Myracle

*Attorney, Agent, or Firm*—Cushman, Darby & Cushman

[57] ABSTRACT

The throttle valve position detecting device includes a metal fitting having a projection. This fitting is fixed to a throttle shaft, and a throttle position sensor is provided for detecting the position of a throttle valve by detecting the rotary position of the projection. The throttle position sensor includes a rotary shaft having the same rotary axis as the throttle shaft, a rotary element fixed to the rotary shaft and engaged with the projection of the metal fitting to be rotated thereby, a coil spring to press the rotary element against the projection, and a detecting circuit for electrically detecting the position of the throttle valve from rotation of the rotary shaft. The throttle shaft is supported relative to a throttle body through a bearing. Clearance between the throttle shaft and the bearing permits the throttle shaft to move while the automotive engine is idling. The positions of the metal fitting and the rotary element are such that the crossing angle of the moving direction of the throttle shaft due to the clearance and the rotary power transmitting direction of the projection to the rotary element during the engine idling condition is 90 degrees. Therefore, as the rotary element does not move at all even if the throttle shaft moves due to the clearance, the throttle position sensor can produce a proper electric signal during the engine idling condition.

5 Claims, 7 Drawing Figures

THROTTLE VALVE POSITION-DETECTING DEVICE FOR A VEHICLE ENGINE

BACKGROUND OF THE INVENTION

The present invention relates to a throttle valve position-detecting device for a vehicle for detecting a position of a throttle valve in a throttle body provided for an internal combustion engine mounted on the vehicle, e.g., the engine for propelling the vehicle.

In the past, there has been provided a conventional throttle valve position detecting device comprising a first rotary element having a projection, this first rotary element being fixed to a throttle shaft, and a throttle position sensor for detecting the position of a throttle valve from the position of the projection. The conventional throttle position sensor comprises a rotary shaft having the same rotary axis as the throttle shaft, a second rotary element fixed to the rotary shaft and engaging the projection of the first rotary element to be rotated by the projection, a coil spring to press the second rotary element to the projection, and a detecting circuit for electrically detecting the position of the throttle valve from rotation of the rotary shaft. The throttle shaft has a butterfly valve as a main part of the throttle valve and intersects a throttle bore through which air is lead to the internal combustion engine. The throttle shaft is supported by a bearing provided in a throttle body in which the throttle bore is formed.

When such a prior art detecting device as described above is used for a long time, the clearance between the throttle shaft and the bearing becomes large by virtue of abrasion therebetween. As the butterfly valve in the throttle bore strongly receives a negative pressure from the internal combustion engine during the idling condition thereof, the throttle shaft moves downwardly as permitted by the clearance.

In the above-mentioned conventional detecting device, the moving direction of the throttle shaft is perpendicular to a contact face of the second rotary element and the projection of the first rotary element during the engine idling condition, that is, the crossing angle of the moving direction of the throttle shaft and the rotary power transmitting direction from the projection of the first rotary element to the second rotary element during the engine idling condition is 0 degrees. Therefore, as the projection of the first rotary element causes the second rotary element to move in accordance with the moving of the throttle shaft, the throttle position sensor no longer properly detects the idling position of the throttle valve irrespective of the engine idling condition.

SUMMARY OF THE INVENTION

According to the present invention, the second rotary element and the projection of the first rotary element are positioned with such a relationship that the crossing angle of the moving direction of the throttle shaft and the rotary power transmitting direction for the projection of the first rotary element to the second rotary element during the engine idling condition is within a range from 45 to 90 degrees.

Therefore, even if the throttle shaft moves due to the clearance between the throttle shaft and the bearing, the amount of movement of the second rotary element by the projection of the first rotary element is less than that of the conventional detecting device.

In the case where the crossing angle is 90 degrees, the second rotary element does not move at all, even if the throttle shaft moves.

On the other hand, in the case where the crossing angle is 45 degrees, the amount of movement of the second rotary element is about one-half of the amount of movement of the throttle shaft.

BRIEF DESCRIPTION OF THE DRAWINGS

These and other objects and advantages of this invention will become more apparent and more readily appreciated from the following detailed description of the presently preferred exemplary embodiment of the invention, taken in conjunction with the accompanying drawings, in which.

DETAILED DESCRIPTION OF THE PREFERRED EMBODIMENTS

The present invention will now be described hereinunder with reference to the preferred embodiments thereof.

Figure 1:
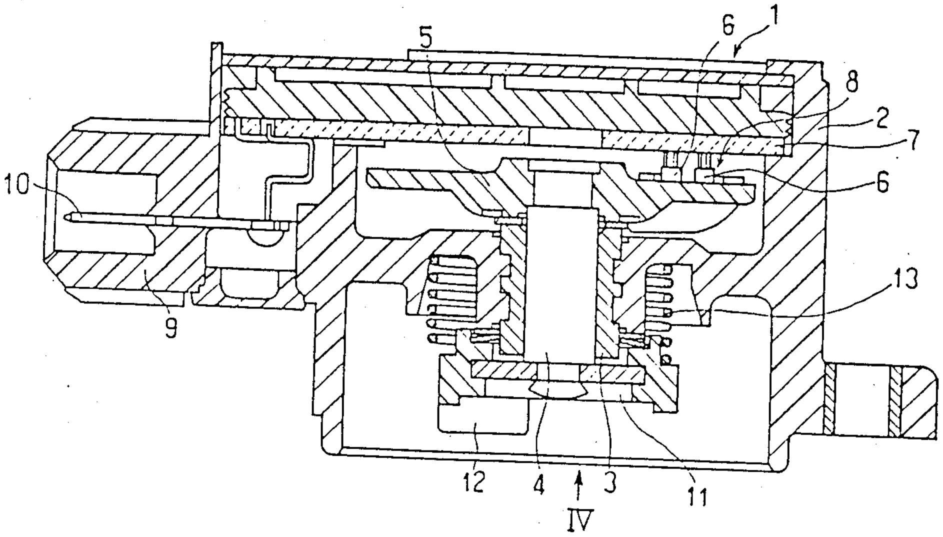
FIG. 1 is a cross-sectional view showing a throttle position sensor according to a first embodiment of the present invention.

FIG. 1 is a cross-sectional view showing a throttle position sensor according to a first embodiment. In FIG. 1, numeral 1 designates a throttle position sensor, numeral 2 a sensor housing made of synthetic plastic resin and rotatably supporting a rotary shaft 4 in throttle position sensor 1 through a bearing 3. At one end of rotary shaft 4, a rotor 5 is fixed thereto. Rotor 5 has brushes 6 as part of switch means 8 for electrically detecting an idling position of a throttle valve on the facing side of rotor 5; a plate 7 made up of ceramics is provided. Plate 7 has an electric conductor, which is not shown in FIG. 1, for contacting brushes 6 thereby to produce an electric signal indicative of the engine idling condition. The electric conductor on plate 7 and brushes 6 constitute switch means 8 which produces an electric signal according to rotation of rotary shaft 4. The electric signal from switch means 8 is lead to outside through a terminal 10 in a connector 9. Terminal 10 is connected to an electric circuit for controlling an internal combustion engine (which is not shown in FIG. 1). Switch means 8 may be constituted by brushes 6 and a resistor formed on plate 7 for operating as a variable resistor. At the other end of rotary shaft 4, a lever 11 is fixed thereto. On part of lever 11, a rotary element 12 is formed integrally with the lever 11.

Numeral 13 designates a coil spring provided between sensor housing 2 and lever 11. Coil spring 13 is wound by rotation of the throttle shaft, while being unwound to cause lever 11 to return to the original position thereof when the throttle shaft has returned to the original position thereof.

Figure 2:
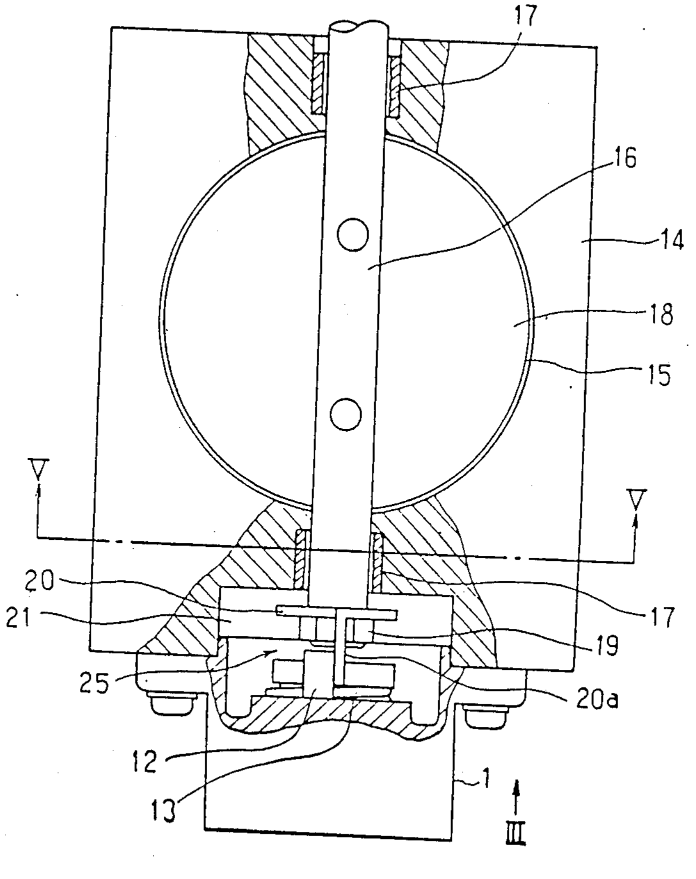
FIG. 2 is a fragmentary cross-sectional view showing a condition in which the throttle position sensor is fitted to a throttle body according to the first embodiment.

FIG. 2 is a fragmentary cross-sectional view showing a condition in which the throttle position sensor 1 is fitted to throttle body 14. In FIG. 2, numeral 15 designates a throttle bore formed in throttle body 14, numeral 16 a throttle shaft intersecting the throttle bore 15, numeral 17 a bearing for supporting throttle shaft 16 rotatably in throttle body 14, and numeral 18 a butterfly valve as a main part of a throttle valve. FIG. 2 shows the engine idling condition, in which butterfly valve 18 closes throttle bore 15.

To one end of throttle shaft 16, metal fitting 20 is fixed with a nut 19. Metal fitting 20 has a projection 20*a* formed by folding a portion of metal fitting 20.

Figure 3:
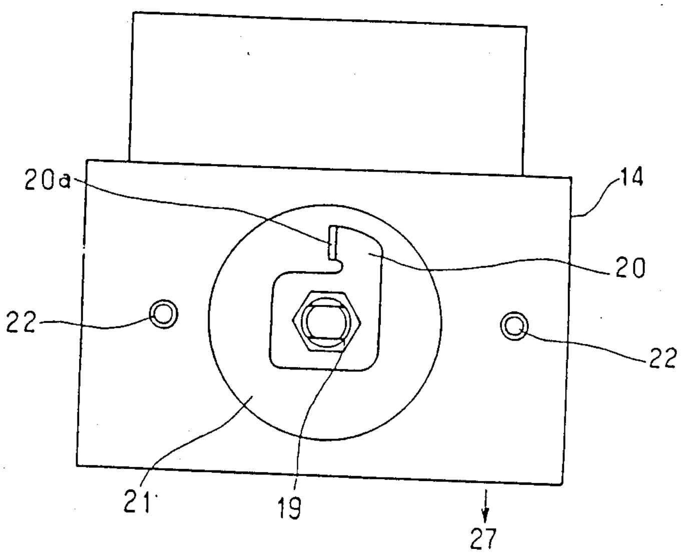
FIG. 3 is a side view of the throttle body taken in the direction of arrow III of FIG. 2.

FIG. 3 is a side view of the throttle body 14 shown in FIG. 2 and shows a state in which the metal fitting 20 is fixed by means of the nut 19 to one end of the throttle shaft 16. Numeral 21 designates a portion formed in a side face of the throttle body 14, and numeral 22 screw boxes formed in the side face of throttle body 14.

Figure 4:
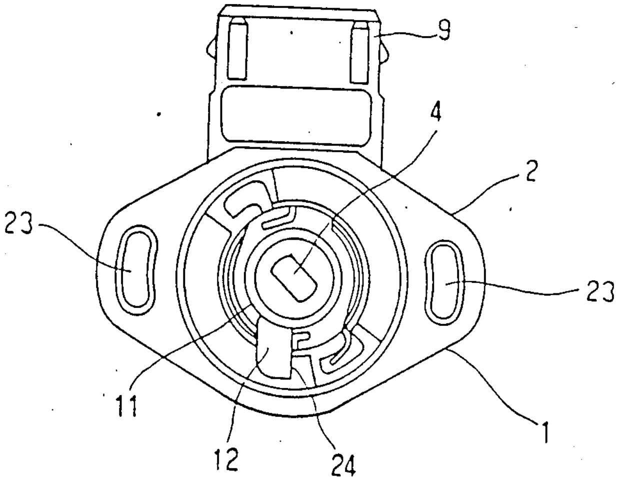
FIG. 4 is a bottom plan view of the throttle position sensor to be fitted to the throttle body shown in FIG. 3.

FIG. 4 is a bottom plan view of the throttle position sensor 1 looking in the direction of arrow IV in FIG. 1 and shows a state in which the rotary shaft 4 has been rotated from a condition shown in FIG. 1 due to the engine idling condition. Throttle position sensor 1 is fitted to throttle body 14 so that a side face 24 of rotary element 12 faces projection 20*a* of metal fitting 20 and holes 23 of sensor housing 2 overlap screw boxes 22 then to be fixed by screws (not shown). When the throttle position sensor 1 has been fitted to throttle body 14, rotary element 12 is pressed toward projection 202 of metal fitting 20 by virtue of coil spring 13 thereby to rotate together with metal fitting 20.

Operation of the above-described embodiment will be described next.

In the engine idling condition as shown in FIG. 2, as brushes 6 contact the electric conductor on plate 7, an electric signal indicating of the engine idling condition is produced from terminal 10.

On the other hand, when the throttle shaft 16 rotates by operation of an accelerator (not shown), the metal fitting 20 fixed to the throttle shaft 16 rotates to cause the rotary element 12 to rotate together therewith. By rotation of the rotary element 12, rotary shaft 4 rotates. Therefore, brushes 6 no longer contact the electric conductor on plate 7, so that an electric signal indicating that the engine is not idling is produced from terminal 10.

Figure 5:
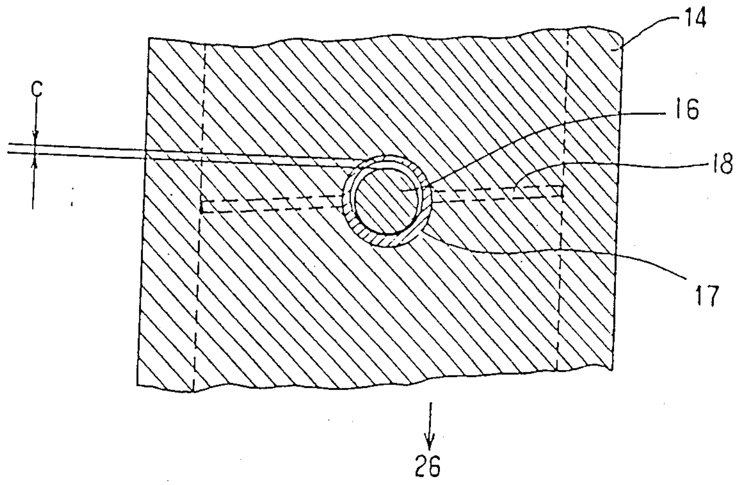
FIG. 5 is a fragmentary cross-sectional view along the line V—V of FIG. 2.

On this device, when bearing 17 supporting throttle shaft 16 becomes worn by being used for a long time, the clearance between the bearing 17 and the throttle shaft 16 becomes large. The clearance is designated by the letter C in FIG. 5. The clearance causes the position of throttle shaft 16 to change toward the direction shown by arrow 26 in FIG. 5 during the engine idling condition, as butterfly valve 18 strongly receives a negative pressure from the internal engine. The change of the position of throttle shaft 16 causes metal fitting 20 to move toward the direction of arrow 26, whereby projection 20*a* moves in the same direction as metal fitting 20. The moving of projection 20*a* gives no rotary power to rotary element 12, as the moving direction of throttle shaft 16 and a rotary power transmitting direction from the projection 20*a* to the rotary element 12 cross each other at an angle of 90 degrees. Therefore, as rotary shaft 4 does not rotate, the electric signal from throttle position sensor 1 does not change at all.

A second embodiment of the present invention will be described next. In this embodiment, the above-mentioned crossing angle is set to 45 degrees.

Figure 6:
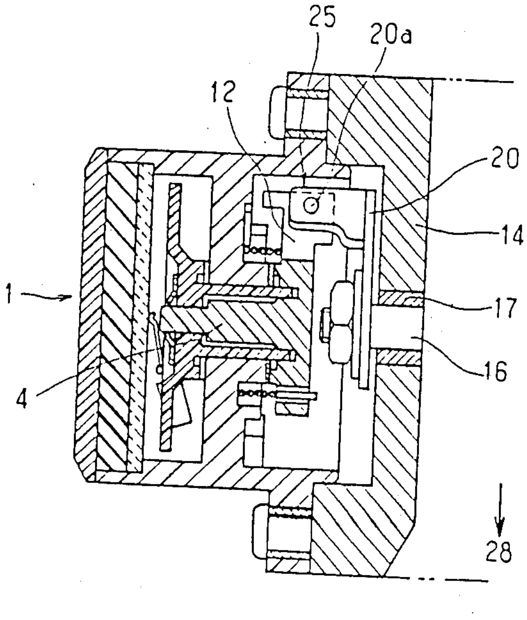
FIG. 6 is a cross-sectional view of the throttle position sensor according to a second embodiment of the present invention.
Figure 7:
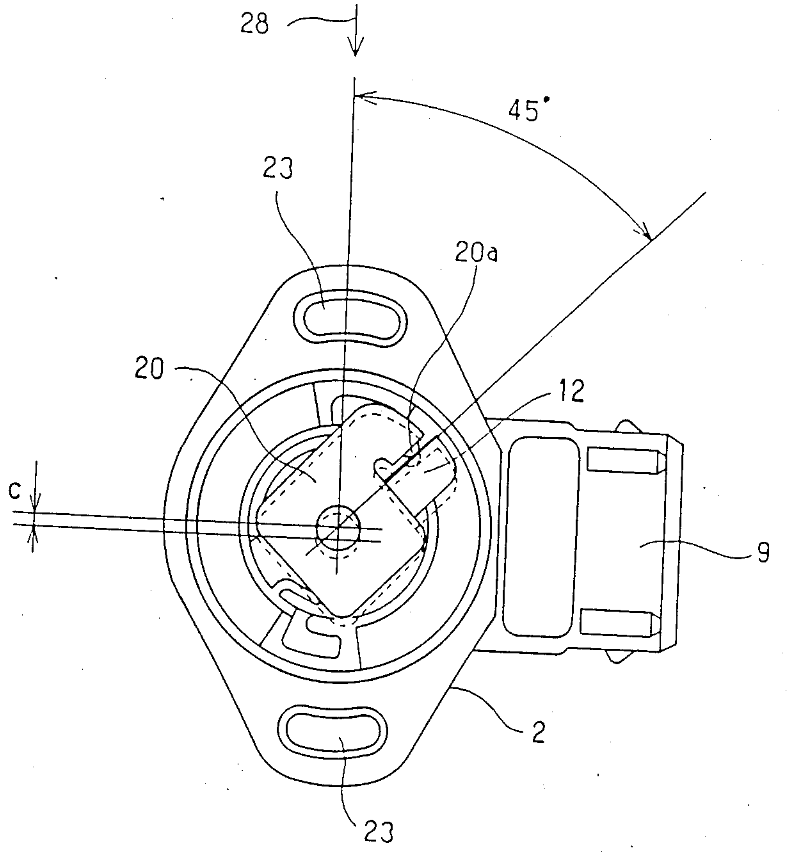
FIG. 7 is a side view of the throttle position sensor along the line VII—VII of FIG. 6.

FIG. 6 shows a cross-sectional view of the throttle position sensor 1 according to this embodiment and FIG. 7 shows a side view of throttle position sensor 1 along the line VII—VII of FIG. 6.

In this embodiment, the throttle position sensor 1 is fitted to the throttle body 20 so that holes 23 of the sensor housing 2 are aligned in the direction in which air flows through throttle bore 15, that is, the direction in which throttle shaft 16 moves when the engine is idling. The direction is shown by arrow 28. Metal fitting 20 has a round projection 20*a* for touching the rotary element 12. The crossing angle of the rotary power transmitting direction from the round projection 20*a* to the rotary element 12 and the moving direction 28 is set at 45 degrees.

In the above arrangement, throttle shaft 16 moves due to the clearance C between the throttle shaft 16 and the bearing 17 during the engine idling condition, whereby metal fitting 20 causes rotary element 12 to move to the rotary power transmitting direction as shown in dotted lines of FIG. 7. In this case, the amount of movement of the rotary element 12 is about one-half that of moving of throttle shaft 16, which allows throttle position sensor 1 to produce an electric signal correctly while the engine is idling.

Although only two exemplary embodiments of this invention have been described in detail above, a throttle valve position-detecting device in which the above-mentioned crossing angle is within 45 to 90 degrees can be understood to be able to make use of the principles of this invention.

What is claimed is:

1. A throttle valve position-detecting device for a vehicle, for detecting the position of a throttle valve in a throttle body provided for an engine mounted on said vehicle, by detecting rotation of a throttle shaft of said throttle valve, and in which said throttle shaft is supported to said throttle body through a bearing, said throttle valve position-detecting device comprising:

- a first rotary element fixed to said throttle shaft for rotating together with said throttle shaft;
- a second rotary element contacting said first rotary element for rotating with said first rotary element by receiving rotary power from said first rotary element;
- spring means for pressing said second rotary element towards said first rotary element against said rotary power; and
- detecting means for detecting from a rotary position of said second rotary element at least a position of said throttle valve corresponding to an idling condition of said engine;
- said first and second rotary elements being positioned with such a relationship as a crossing angle of a moving direction of said throttle shaft by clearance between said throttle shaft and said bearing and a transmitting direction of said rotary power from said first rotary element to said second rotary element during said idling condition of said engine being within a range from 45 to 90 degrees.

2. A detecting device according to claim 1, wherein: said first rotary element comprises a projection adapted to engage said first rotary element.

3. A detecting device according to claim 2, wherein: said projection is round.

4. A detecting device according to claim 2, further comprising:

a rotary shaft having the same rotary axis as said throttle shaft, said second rotary element being fixed to said rotary shaft to rotate together therewith.

5. A detecting device according to claim 4, wherein: said detecting means includes switch means for producing an electric signal according to rotation of said rotary shaft.

* * * * *